United States Patent [19]

Kalmus

[11] 4,074,227
[45] Feb. 14, 1978

[54] TIRE PRESSURE INDICATOR

[76] Inventor: Henry P. Kalmus, 3000 University Terrace, NW., Washington, D.C. 20016

[21] Appl. No.: 683,431

[22] Filed: May 5, 1976

Related U.S. Application Data

[63] Continuation-in-part of Ser. No. 524,285, Nov. 15, 1974, abandoned.

[51] Int. Cl.$^2$ .................... B60C 23/02; G08B 19/00
[52] U.S. Cl. .................... 340/58; 73/146.5; 340/224; 343/6.8 R
[58] Field of Search .................... 340/58, 152 T, 224; 343/6.5 R, 6.5 SS, 6.8; 200/61.22, 61.25; 73/146.5; 325/8

[56] References Cited

U.S. PATENT DOCUMENTS

| | | | |
|---|---|---|---|
| 3,299,424 | 1/1967 | Vinding | 343/6.5 |
| 3,406,391 | 10/1968 | Le Von, Jr. | 343/6.5 |
| 3,559,195 | 1/1971 | Dotto | 340/224 |
| 3,662,335 | 5/1972 | Fritze | 340/58 |
| 3,694,803 | 9/1972 | Strenglein | 340/58 |
| 3,723,966 | 3/1973 | Mueller et al. | 340/58 |
| 3,739,326 | 6/1973 | Keledy | 340/416 |
| 3,798,642 | 3/1974 | Augenblick et al. | 343/7 ED |
| 3,806,905 | 4/1974 | Strenglein | 340/224 |
| 3,881,170 | 4/1975 | Aosaka et al. | 340/52 F |
| 3,911,434 | 10/1975 | Cook | 343/6.5 R |
| 3,922,639 | 11/1975 | Shimahara et al. | 340/52 F |

Primary Examiner—Donald J. Yusko
Assistant Examiner—Joseph E. Nowicki
Attorney, Agent, or Firm—Nathan Edelberg; Robert P. Gibson; Saul Elbaum

[57] ABSTRACT

An improved system is disclosed for electro-magnetically monitoring the condition of a vehicle tire which has a plurality of possible states, such as an internal air pressure which can fall within predetermined limits. The system is of the type which comprises a transmitter which serves to transmit to the monitored vehicle tire an interrogation signal composed of a carrier wave modulated at a predetermined modulating frequency. The tire to be monitored carries a transponder device which is operable in response to the state of the tire for passively detecting the modulating frequency of the interrogation signal and retransmitting an information signal at the modulating frequency. A receiver is provided responsive to the retransmitted information signal so as to provide an output which is indicative of the state of the device being monitored.

The transponder includes an improved signal coil, embedded within the body of the vehicle tire and disposed as a circular loop about the tire, coaxial with the axis of rotation thereof. This improved coil configuration enables a continuous and more uniform display of the condition of the tire when the vehicle is in motion.

11 Claims, 5 Drawing Figures

TIRE PRESSURE INDICATOR

RIGHTS OF THE GOVERNMENT

The invention described herein may be manufactured, used and licensed by or for the United States Government for governmental purposes without the payment to me of any royalties thereon.

This is a continuation-in-part of U.S. Pat. application Ser. No. 524,285 filed Nov. 15, 1974 now abandoned.

BACKGROUND OF THE INVENTION

This invention generally relates to remote monitoring systems and is particularly concerned with a system for electro-magnetically monitoring the condition of a vehicle tire having a plurality of possible states.

It is often times desirable to obtain information about the physical condition of a device disposed at a location remote from the monitoring location. In some environments, an electrical interconnection can be made between the monitoring apparatus and the device through wires and the like. Where such actual physical interconnection is not possible, a so-called "radio link" can be established with the remote device being interrogated by a radio frequency signal transmitted from the monitoring location with the remote device retransmitting a signal to a receiver location, such retransmitted signal containing information indicative of the condition of such device. Typically, the transponding apparatus disposed at the remote device which is being monitored requires an internal source of electrical power and/or requires careful tuning so as to provide stable operation.

In many adverse environments, it is simply not possible to provide an internal source of power for the transponding apparatus, nor is it practical to require such a transponding apparatus to possess critical or sensitive tuning characteristics or the like. One particular adverse environment is that in which the transponding apparatus is disposed on a moving vehicle tire so as to provide reliable information relative to the air pressure within such tire.

A monitoring system is disclosed in the above identified parent patent application, which serves in a reliable fashion to monitor the condition of a remote device, such as a tire for a vehicle, such tire having a plurality of possible states, such as an air pressure which is "too high" or "too low" in accordance with pre-established criteria. In its basic form, the system disclosed in the parent patent application incorporates a transmitter means which serves to transmit an interrogation signal which is composed of a carrier wave modulated at a predetermined modulating frequency. The transmitter means is disposed at a location in close proximity to such tire such as within the vehicle wheel well. A transponder means is further provided preferably at the remote device such as attached to the valve stem of the vehicle tire, such transponder means being operable in response to the state of the device being monitored for passively detecting the modulating frequency of the interrogation signal and retransmitting an information signal at the modulating frequency. The receiver means is also provided preferably in the immediate vicinity of the transmitter which is responsive to the retransmitted information signal from the transponder means for providing an output indicative of the state of the device being monitored, i.e. indicative of the air pressure within the vehicle tire.

The transponder means is constructed of a coil, a non-linear electrical element disposed in a closed series circuit loop and a switch disposed in the loop and actuable to close same in response to the state of the device being monitored. The non-linear circuit element develops a voltage thereacross at the carrier frequency so that a current at the modulating frequency flows through the coil to generate an electro-magnetic field, the field defining the information signal. These three elements are all housed in a compact container and may, for example, be attached to the valve stem of the tire.

Although the vehicle tire pressure monitoring system disclosed in the parent patent application works well, the signal coupling the transmitter, transponder and receiver will be of varying strength due to the variability in the separation distance between the transponder's coil and the transmitter and receiver. This may result in a non-uniform display of the tire pressure by the monitoring system when the vehicle is in motion.

OBJECTS OF THE INVENTION

It is therefore an object of the invention to provide a more uniform display of the tire pressure in a moving vehicle.

It is another object of the invention to provide a more uniform operation for an electro-magnetic tire pressure monitoring system.

SUMMARY OF THE INVENTION

These and other objects, features and advantages of the invention are accomplished by the improved tire pressure indicator disclosed herein. The invention finds application in a system for electro-magnetically monitoring the condition of a vehicle tire having a plurality of possible states. The system includes a signal transmitter means, a signal receiver means and a signal transponder means including a signal coil, coupled with the vehicle tire. The inventive improvement comprises embedding the signal coil within the body of the vehicle tire and disposing it as a circular loop about the tire, coaxially with the axis of rotation thereof. This enables a constant separation distance to be maintained between the signal coil and the transmitter and receiver means, thereby rendering more uniform, the operation of the system and the display of the pressure condition of the tire.

BRIEF DESCRIPTION OF THE DRAWINGS

The invention itself will become better understood and further features, advantages and uses thereof will become apparent from the following detailed description of the preferred inventive embodiment, such description making reference to the accompanying drawings wherein.

DETAILED DESCRIPTION OF THE PREFERRED INVENTIVE EMBODIMENT

Figure 1:
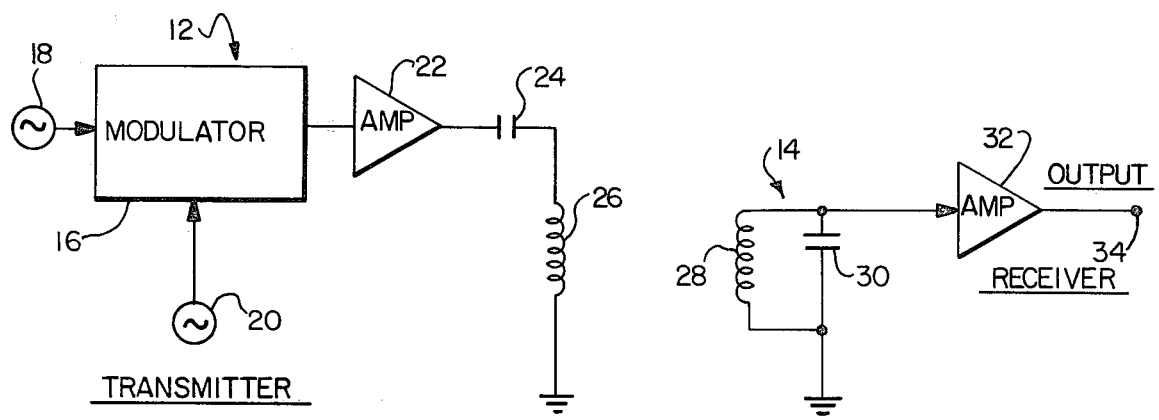
FIG. 1 is an electrical schematic diagram of the overall system of the instant invention depicting a basic form of the passive transponder which is provided.
Figure 1:
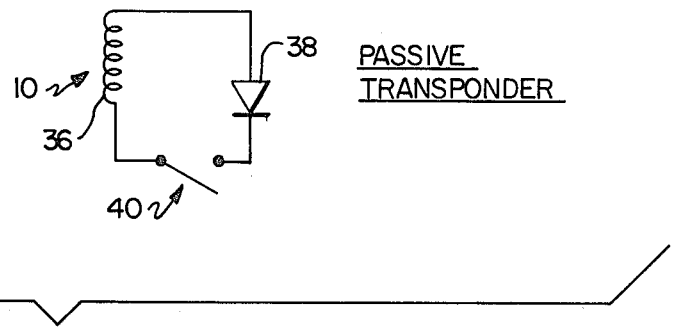

With reference now to the appended drawings and particularly to FIG. 1 thereof, the basic principle of the instant invention can be understood. Initially, it will be assumed that the condition of some remote device having a plurality of possible states is to be monitored at some monitoring location. In this respect, the passive transponder element of the instant invention generally designated by reference numeral 10 would be provided at the location of the remote device, whereas the transmitter element generally designated by reference numeral 12 and the receiver element generally designated by reference numeral 14 would be provided at the monitoring location.

The transmitter means 12 of the instant invention preferably constitutes a modulator circuit 16 of conventional construction designed to modulate a carrier wave provided by carrier wave generator 18 with a predetermined modulating frequency such as would be provided by a modulation frequency oscillator 20 as shown. In the preferred inventive embodiment the carrier signal provided by the generator 18 could comprise a carrier having a frequency of 2MHZ, which carrier would be 100 percent modulated by modulator 16 at the modulating frequency provided by the output of generator 20, which modulating frequency would be 3KHZ. As will be recognized, therefore, the frequency of the carrier signal is significantly higher than the frequency of the modulating signal, which frequency difference will be seen to facilitate the reliable filtering and separation of such signals during operation of the monitoring system. The output from modulator 16 constituting a carrier wave modulated at the predetermined modulating frequency is then amplified by a conventional amplifier 22, the circuit being terminated by the serial connection of capacitor 24 and inductor or coil 26, which elements are tuned to the carrier frequency. In this fashion, all residual energy at the modulating frequency would be removed from the field produced by the coil 26.

Disposed adjacent the transmitter 12 is the receiver means 14, which receiver means will be seen to constitute a parallel circuit of coil or inductor 28 and capacitor 30, such parallel circuit being tuned to the modulating frequency of the modulated carrier wave. The output from the parallel tuned LC circuit 28, 30 is then fed to a conventional amplifier 32 which provides an output as at 34.

As can be appreciated, without any non-linear electrical elements coupled to the coil or inductor 26 of the transmitter means, no signal at the modulating frequency of the carrier wave will appear at the output 34 of amplifier 32 of the receiver means 14.

Disposed at the location of the device being monitored but still near enough to be acted upon by the field or "interrogation signal" produced by the transmitter means 12 is the passive transponder element 10 as was above-discussed. The passive transponder element 10 will be seen to comprise a coil 36 having but several turns, such coil being shunted by a non-linear circuit element such as diode 38 upon closure of a switch such as is indicated by reference numeral 40. Thus, when switch 40 is closed, a series circuit or closed loop exists containing the non-linear element such as diode 38, and the coil 36. The condition of switch 40, i.e. whether or not such switch is open or closed is controlled by the condition of the remote device being monitored, i.e. by the particular state in which the remote device is in. Thus, if the remote device were a vehicle tire, the air pressure which was being measured, switch 40 would constitute a simple pressure transducer which, for example, would serve to close the series circuit of diode 38 and coil 36 upon an indication of a "too high" pressure, for example, and which would serve to open switch 40 at other times.

In any event, and upon closure of switch 40, the passive transponder will react to the so-called "interrogation signal" generated by transmitter means 12 such that a voltage at the carrier frequency will appear across the diode 38 and such that a current at the modulating frequency will flow in the coil 36. The field produced by this current flow at the modulating frequency within coil 36 therefore constitutes a retransmitted so-called "information signal" at the modulating frequency, which information signal is, of course, indicative of the state of the device being monitored.

This retransmitted signal, i.e. the field produced by the current within coil 36, is intercepted by the receiver means 14. Since the retransmitted signal is at the modulating frequency to which the parallel LC circuit 28, 30 of the receiver means 14 is tuned, an output will appear at terminal 34 of the amplifier 32, such being utilizable so as to provide an indication of the state of the device, i.e. the pressure within the tire.

The arrangement above-discussed has been found to be quite reliable in practice and has evidenced a surprisingly high sensitivity. For example, and presuming that the coils 26 and 28 of the transmitting and receiving elements, respectively, are provided with diameters equal to 2 inches, and presuming that the diameter of coil 36 of the passive transponder 10 is equal to 15 inches, a distance of 2 inches between coils 26, 28, and 36 would be sufficient to provide an output at terminal 34 having an excellent signal to noise ratio. In this instance, the disposition of the transmitting and receiver elements 12 and 14, respectively, would be at a location such that the passive transponder 10 passed within several inches thereof so as to insure an adequate and reliable response. From the standpoint of voltages measured, and assuming that a voltage of 20 volts appeared across the coil or inductor 26 and that a distance of 2 inches was provided between coils 26, 28, and 36, the voltage appearing at the input of amplifier 32 would be approximately 3mV at the fequencies of interest assuming, of course, that switch 40 were closed.

The basic embodiment of the instant invention as above-discussed has been seen to provide a single output representative of the state of the remote device being monitored, this single output being either the presence or the absence of a signal from amplifier 32 representing, respectively, the closure or opening of switch 40 as might be caused by the pressure of air within the tire. It is possible to improve upon this operation through the provision of a modified passive transponder circuit such that a distinguishable output signal can be obtained from amplifier 32 both when the tire pressure were "too high" or "too low", for example, and when the tire pressure was "normal", thus providing fail-safe operation of circuitry in that a signal always would be present during proper operation of the device.

Figure 2:
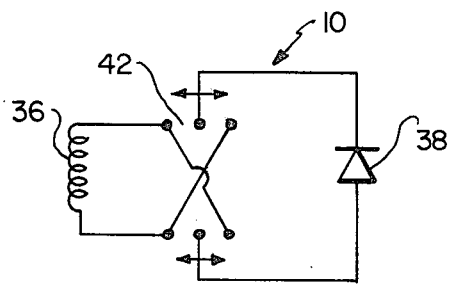
FIGS. 2 and 3 are electrical schematic diagrams depicting respectively different variants of the transponder circuitry of the instant invention.

Attention is directed to FIG. 2 of the application drawings for an illustration of one variant of the transponder circuitry so as to provide a plurality of distinguishable signals evidencing the respective state of a plurality of different states of the device being monitored. In FIG. 2, like elements are depicted by the same reference numeral as was used with respect to the basic embodiment of FIG. 1. In FIG. 2, a conventional reversing switch indicated by reference numeral 42 is provided between the coil 36 and the non-linear circuit element such as diode 38 as is illustrated. In one position of the reversing switch 42, the diode 38 would be disposed in series circuit with coil 36 with one polarity. In the other position of the reversing switch 42, the diode 38 would be disposed in the closed loop with coil 36 in an opposite polarity. The "information signal" retransmitted from the passive transponder, i.e. the field produced by the current flowing through the coil 36 of the transponder, would have one phase for one position of the switch 42 and the opposite phase for the position of reversing switch 42. Further, the output 34 of amplifier 32 of the receiving means 14 would be coupled to a non-illustrated conventional phase detector. In this embodiment, an indication could be obtained for both "normal" or "too low" tire pressure presuming that the passive transponder 10 are attached to the tire of a vehicle, all as would be determined by the form of pressure transducer attached to the reversing switch 42. Assuming that a mode of operation were selected wherein an information signal having one phase was produced when the tire pressure was below some predetermined amount, and a further information signal having the opposite phase was produced when the tire pressure was above such predetermined amount, an output would always be obtained from amplifier 32 and the associated phase detector unless the circuitry became inoperative. Thus, "fail-safe" operation would result.

Figure 3:
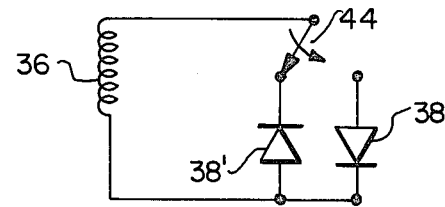

A further variant of the passive transponder of the instant invention which would functionally produce the same result as the embodiment of FIG. 2 can be found in FIG. 3 of the application drawings. Here, two separate and oppositely poled diodes, such as diode 38 and 38' are provided. Depending upon the position of the reversing switch 44, one or the other of such diodes would be placed in the closed loop circuit with coil 36, thus providing a retransmitted information signal selectively having two different phases or polarities.

Figure 4:
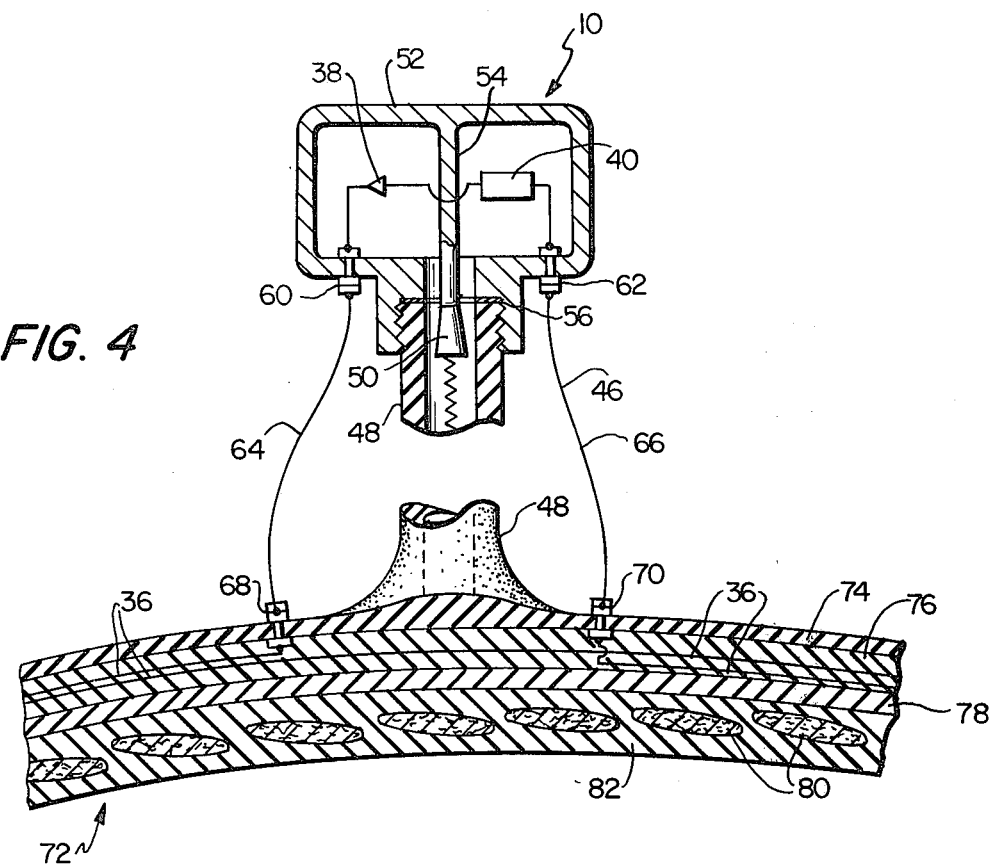
FIG. 4 is a sectional schematic illustration depicting the placement of the passive transponder element of the instant invention on the valve stem of a vehicle tire, and the position of the transponder's coil embedded circumferentially in the carcass of the tire.

With reference now to FIG. 4 of the application drawings, one preferred physical disposition of the passive transponder element 10 of the instant invention is shown in conjunction with a valve 46 of a vehicle tire, valve 46 containing the conventional stem 48 and internal spring loaded stem element 50 as is shown. Except for the coil 36, the passive transponder 10 of the instant invention would be disposed within a plastic cap 52 designed to replace the conventional plastic cap normally found on a vehicle tire valve stem 48. The plastic cap 52 would contain an internal downwardly projecting member 54 which would make contact with the spring-loaded mechanism 50 and, as the plastic cap 52 was threaded down over the valve stem 48, the pressure within the tire to which the valve was connected would fill the internal chambers of the plastic cap. The plastic cap is further contemplated to be sealed to the stem 48 by means of the provision of a gasket 56 as is shown.

Figure 5:
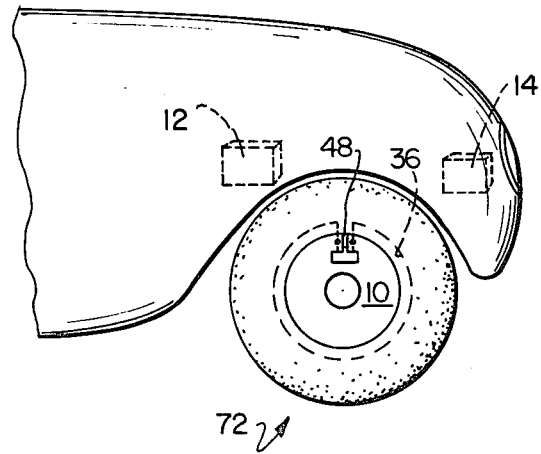
FIG. 5 illustrates how the transponder's coil is positioned coaxially with the rotational axis of the tire.

Within the plastic cap 52 are molded feed through elements 60 and 62, to which would be coupled the non-linear circuit element such as diode 38 through a switch 40 which, in this instance, would constitute a simple pressure transducer serving to open and/or close the loop circuit of diode 38 and coil 36 depending upon the pressure sensed within the chambers of the plastic cap 52. FIG. 4 illustrates how the coil 36 is embedded in the carcass of the tire 72. FIG. 5 illustrates the coil 36 with the loop substantially coaxial with the rotational axis of the tire 72. The coil 36 can have from one to five turns, for example, and is actually vulcanized into the carcass of the tire 72, about the circumference of same, within the sidewall or the tread. The advantage of this coil configuration is that the coil 36 remains at a substantially fixed distance from the transmitter 12 and receiver 14 so that a constant signal coupling strength can be maintained. This enables a continuous and more uniform display of the tire's condition, for example, even when the vehicle is moving.

FIG. 4 shows a cross sectional view of the carcass of tire 72 with a detailed view of the embedded coil 36, therein. Over multiple layers of polyester cord 80, bound in the matrix 82, the coil 36 is wound about the circumference of the tire 72, with the coil loops being substantially coaxial with the axis of the tire. The coil 36 is encapsulated in a multiple layer composite of polybutadiene rubber, for example, with layers 74 and 78 sandwiching the coil 36 which is embedded in layer 76. Electrical feed throughs 68 and 70 electrically connect with the respective ends of coil 36 and are encapsulated therewith in the layer 74. External contacting ends of feed throughs 68 and 70 are exposed externally to the body of tire 72, to enable external electrical contact therewith.

When the plastic cap 52 for the passive transponder element 10, is mounted on the valve stem 48 of tire 72, wire 64 connects the feed through 60 to the coil's feed through 68 and wire 66 connects the feed through 62 to the coil's feed through 70. This completes the circuit for the passive transponder 10. Wires 64 and 66 can be mechanically fastened to the side of stem 48 to insure mechanical integrity.

Other embodiments for the tire 72 and valve stem 48 may be employed so long as the coil 36 is circumferentially disposed about the tire 72 so as to be coaxial with the axis of rotation. FIG. 4 shows the stem 48 as an integral part of the tire 72. However, other suitable embodiments could include on where the stem 48 is part of a conventional inner tube which is encased within the carcass of tire 72. Still another embodiment could employ a conventional tubeless tire as tire 72, which is mounted on a metal wheel. The stem 48 would, in turn, be mounted on the metal wheel in the conventional manner. Other materials may be selected for the composition of the coil encapsulation material 76, for example, various formulations of synthetic rubber.

Another alternate embodiment for the transponder coil 36 is to wrap the coil 36 circumferentially about the wheel upon which the tire 72 is mounted, so that the coil is disposed in a circular loop about the wheel, coaxial with the axis of rotation thereof. In wheels upon which conventional tubeless tires are mounted, the ends of the coil can be fed through or adjacent to the valve stem 46, which is also mounted to the wheel.

In this embodiment, the transmitter means 12 as well as the receiver means 14 would be disposed in close vicinity to the coil 36 in tire 72, such as being mounted within the wheel well, for example, thus providing a more continuous and uniform indication of tire pressure without the necessity of physical contact with the tire. By embedding coil 36 circumferentially about the tire, a uniform signal strength will be insured.

While the invention has been described above as having particular utility to indicate the condition of a vehicle tire, it should be appreciated by those skilled in the art that the monitoring system herein can be utilized in various other environments. For example, the monitoring system can be utilized to detect the passage of a vehicle such as a railroad car, for example, and even read a code provided on such car thus additionally providing an indication of the type of car that had passed. In this instance, the car would be provided with two or more separate passive transponder units mounted on the same wheel or on several wheels of the vehicle. The non-linear circuit element or diode of each separated transponder unit would be poled in accordance with any particular desired binary code. Thus, if four or more separate transponder elements were provided on the car, virtually any digital number could be obtained depending on the diode polarities to identify the passive car. The receiver element would therefore be sequentially activated by each transponder element as the car passed, and, with the addition of suitable and conventional digital-to-analog converters disposed at the output of amplifier 32, an identification signal would be obtained.

Other environments of utility will be obvious to the skilled artisan and thus, it should be understood that the invention is not limited to the exact details of construction shown and described herein, but is to be construed in accordance with the scope of the appended claims.

Accordingly, what is claimed is:

1. A system for electro-magnetically monitoring the internal pressure of a tire having a plurality of possible states comprising:
    a. pressure sensor means for determining one of the said plurality of states of said tire;
    b. transmitter means for transmitting an interrogation signal composed of a carrier wave modulated at a predetermined modulating frequency and means tuned to said carrier frequency to remove all residual energy at the modulating frequency;
    c. transponder means, operable in response to said pressure sensor means, for passively detecting said interrogation signal and retransmitting an information signal at said modulating frequency as a function of the state of said sensor, said transponder means comprising a non-linear electrical element series coupled to an inductor;
    d. and receiver means comprising a parallel coupled inductor and capacitor tuned only to said modulating frequency for providing an output indicative of the tire pressure.

2. The system of claim 1, wherein said inductor of the transponder means is wrapped about the wheel upon which said tire is mounted.

3. The system of claim 1, wherein said inductor of the transponder means is embedded within the body of said vehicle tire.

4. The system of claim 3, wherein said inductor of the transponder means is embedded beneath the tread of said vehicle tire.

5. The system of claim 3, wherein said inductor of the transponder means is embedded within the sidewall of said vehicle tire.

6. The system of claim 3, wherein said inductor of the transponder means is composed of a plurality of loops disposed about said vehicle tire.

7. The system of claim 3, wherein said transmitter and receiver means are mounted on said vehicle and said transponder means is mounted proximate to said tire for rotation therewith.

8. The apparatus of claim 1 wherein said inductor of the transponder means comprises a coil disposed in a circular loop coaxial with the axis of said tire.

9. A system as defined in claim 1 wherein said information signal retransmitted by said transponder means at the modulating frequency is of one phase when the device being monitored is in one state and of opposite phase when the device being monitored is in a different state, said receiver means further including a phase detector for detecting the phase of the information signal.

10. A system as defined in claim 1 wherein said transponder means is constructed of a coil, a non-linear electrical element disposed in a closed series circuit loop, said pressure sensor means being disposed in said loop and actuatable to close same in response to the state of the device being monitored, said non-linear element developing a voltage there across at the carrier frequency so that a current at the modulating frequency flows through said coil to generate an electro-magnetic field, said field defining said information signal.

11. A system as defined in claim 9 wherein said transponder means is constructed of a coil and a diode connected in a closed series circuit loop, said pressure sensor means being disposed in said loop and actuatable to reverse the polarity of the connection of said diode in said loop in response to the state of the device being monitored, said diode developing a voltage there across at the carrier frequency so that a current at the modulating frequency flows through said coil to generate an electro-magnetic field, said field and the phase thereof defining said information signal.

* * * * *